No. 785,734.

Patented March 28, 1905.

UNITED STATES PATENT OFFICE.

WILHELM HESS, OF FRANKFORT-ON-THE-MAIN, GERMANY, ASSIGNOR TO LUDWIG WILHELM GANS, OF FRANKFORT-ON-THE-MAIN, GERMANY.

PROCESS OF OBTAINING THE CONTENTS OF YEAST-CELLS.

SPECIFICATION forming part of Letters Patent No. 785,734, dated March 28, 1905.

Application filed August 29, 1902. Serial No. 121,541.

*To all whom it may concern:*

Be it known that I, WILHELM HESS, a citizen of Germany, and a resident of Frankfort-on-the-Main, in the Province of Hesse-Nassau and Kingdom of Prussia, Germany, have invented certain new and useful Improvements in Obtaining the Contents of Yeast-Cells, of which the following is a specification.

In an application for Letters Patent of the United States of America, Serial No. 80,128, filed October 26, 1901, by me there is described and claimed a process of obtaining contents of yeast-cells by causing small quantities of organic liquids that are indifferent to the protoplasm of the yeast-cells to react upon moist yeast, the quantity of solvent used being small—say five per cent., by weight, or even less.

The present invention is based upon the discovery that if water is added to the yeast in quantity sufficient to reduce the mixture to a pulpy or semifluid state access of the organic liquid to the individual cells is considerably facilitated and separation of the contents from the cells occurs in a more rapid and satisfactory manner.

In practicing the process I have preferred to add to the yeast about half of its weight of water. The organic liquid indifferent to the protoplasm of the cells being added to the extent of five per cent. or less, by weight, of the yeast the reaction upon the contents of the cells quite quickly occurs, the mass becoming rapidly completely fluid. For instance, if the mixture be stirred and a temperature of 25° Celsius maintained the operation will be complete in about two hours. If the temperature be lower and agitation of the mass less brisk or non-continuous, the time is naturally somewhat longer. The order in which the yeast, solvent, and water are brought together is not important. The solvent may first be added and then the water, or the water and solvent may be mixed and then added to the yeast. It is preferred, however, to first mix the yeast and water and then add the organic liquid. A somewhat less or greater quantity of water may be used advantageously; but the addition to the yeast of more than an equal quantity, by weight, of water is not only not advantageous to the reaction, but is prejudicial to the after treatment, as a dilute solution is obtained and the cost of concentration is increased.

The after treatment for separation of the contents of the cells may be as described in the above-mentioned application Serial No. 80,128—that is to say, the thin liquid or fluid may be filtered to separate the protoplasm from the empty cells and the filtered liquid boiled to coagulate the albumen, which is separated by a further filtration. The filtered liquid is then evaporated to the desired consistency. Should separation of the albumen and the residuum or empty shells not be desired, the liquefied mass may be first boiled and the protoplasm separated by filtration, the albumen remaining with the empty cells.

The solution, filtered and thickened to the consistency of treacle, resembles in a high degree to meat extract in respect to appearance as well as to qualities and is intended to be employed as a substitute for same.

The organic liquids employed must be indifferent to the protoplasm of the cells, and as examples of those which may be employed the following are named: ethyl ester of acetic acid, ethyl ether, petroleum ether, benzol, and chloroform, in addition to which the following may also be used with more or less satisfactory results: carbon bisulfid, toluol, xylol, thiophene, acetone and its homologues, glycerin, acetin; the flourin, chlorin, bromin, and iodin substitution products of the fatty hydrocarbons—such as methyl iodid, carbon tetra-chlorid, ethyl bromid, and the like—the esters of formic acid, acetic acid, and their homologues, the liquid esters of all organic acids such as tartaric acid, oxalic acid, lactic acid, acetoacetic acid, and the like; chloral hydrate, benzyl alcohol, anilin dimethylanilin, phenol, nitro benzol, and the like. I prefer to use ethyl ester of acetic acid; but equivalently-acting organic liquids, some of which are named above, may be employed. I may state that glycerin, which works satisfactorily in the process claimed in the above-named application Serial No. 80,128, works less favorably in the process of this application.

I claim as my invention—

1. The process of separating the contents of yeast-cells from the cells, which consists in forming a semifluid mixture of moist yeast-cells, water and a relatively small quantity of ethyl ester of acetic acid, allowing the latter to act upon the cells to separate their contents therefrom and produce liquefaction of the mass, and then separating the liquid constituent of the mixture from the empty yeast-cells.

2. The process of separating the contents of yeast-cells from the cells, which consists in mixing moist yeast, water and an organic liquid indifferent to the protoplasm of yeast, allowing the organic liquid to act upon the cells to separate therefrom their contents and produce liquefaction of the mixture, and then separating the fluid constituent of the mixture from the empty cells.

3. The process of separating the contents of yeast-cells from the cells, which consists in making a mixture of yeast, water to the extent of from fifty to one hundred per cent. by weight of the yeast, and five per cent., more or less, by weight of the yeast of an organic liquid indifferent to the protoplasm of the yeast, allowing the organic liquid to act upon the yeast to separate the contents of the cells from the cells, and then separating the liquid constituent of the mixture from the empty yeast-cells.

Signed at Frankfort-on-the-Main, in the Province of Hesse-Nassau and Kingdom of Prussia, this 15th day of August, A. D. 1902.

WILHELM HESS.

Witnesses:
    JEAN GRUND,
    CARL GRUND.